United States Patent [19]

Bender et al.

[11] Patent Number: 5,307,893

[45] Date of Patent: May 3, 1994

[54] AIR CUSHION VEHICLE HAVING VOLUTE SIDE THRUSTERS

[75] Inventors: Gregory L Bender, Metairie, La.; James A. Gleason, Wayeland, Miss.; Joel Bruns, Matairie, La.

[73] Assignee: Textron, Inc., Providence, R.I.

[21] Appl. No.: 5,238

[22] Filed: Jan. 15, 1993

[51] Int. Cl.$^5$ ............................................... B60V 1/14
[52] U.S. Cl. ................................... 180/117; 180/118; 180/120
[58] Field of Search ................ 180/117, 118, 120, 121

[56] References Cited

U.S. PATENT DOCUMENTS

| | | | |
|---|---|---|---|
| 3,208,543 | 9/1965 | Crowley | 180/120 |
| 3,800,905 | 4/1974 | Wright et al. | 180/117 |
| 3,812,930 | 5/1984 | Chaplin | 180/117 |
| 5,042,605 | 8/1991 | Moriwake | 180/117 |

FOREIGN PATENT DOCUMENTS

| | | | |
|---|---|---|---|
| 0039824 | 3/1980 | Japan | 180/120 |
| 0189264 | 8/1991 | Japan | 180/117 |
| 1222213 | 2/1971 | United Kingdom | 180/117 |

*Primary Examiner*—Mitchell J. Hill
*Attorney, Agent, or Firm*—Perman & Green

[57] ABSTRACT

An air cushion vehicle having improved maneuverability is produced by providing air discharge vents for diverting at least a portion of the pressurizing cushion air from the side of the volute housing opposite that to which the vehicle is being turned, and discharging it from a thruster at said opposite side in a direction away from the direction of the turn. The thruster is located at a forward position, above the deck of the vehicle and adjacent the centerline thereof, and the discharged air produces a thrust which causes the vehicle to roll in the direction of the turn and permits cushion air to escape from beneath the vehicle at said opposite side, producing a thrust complimentary to the thrust from the volute housing.

5 Claims, 3 Drawing Sheets

AIR CUSHION VEHICLE HAVING VOLUTE SIDE THRUSTERS

BACKGROUND OF THE INVENTION

The present invention relates to a novel maneuvering system for air cushion vehicles or hovercraft. Puffport systems or side thruster systems are well known which function by the discharge of air from the skirt system to improve the maneuverability of air cushion vehicles, particularly their ability to make turns without excessive side slippage. Such systems traditionally function by diverting a portion of the skirt wall air or the cushion air from beneath the vehicle, on the side to which the vehicle is being turned, whereby the supporting skirt system at that side dips down into the water, and discharging the diverted air from the puffport at said side of the vehicle, but in a direction opposite to the direction of the turn, whereby the air discharging from the puffport provides a thrust to the vehicle in the direction of the turn. The net result is an improved maneuverability or effectiveness in turning the vehicle.

DISCUSSION OF THE PRIOR ART

Reference is made to commonly-assigned U.S. Pat. Nos. 3,800,905 and 3,812,930 for their disclosure of known air cushion vehicle control systems incorporating puffport devices.

The system of U.S. Pat. No. 3,800,905 comprises puffport nozzles located at opposite front corners and also opposite rear corners of the vehicle, if desired, said nozzles being openable to the inflated skirt wall to which they are attached and being directed away from the side of the vehicle at which they are located.

U.S. Pat. No. 3,812,930 discloses a novel valve system for flexible inflated puffports of the type disclosed in U.S. Pat. No. 3,800,905.

Oppositely-directed puffports represent an improvement over puffports which discharge cushion air in the direction of the turn being made. In each case the diversion and discharge of cushion air at the turn side of the vehicle reduces the air pressure in the skirt wall at said side, causing said side to dip down into the water to enable the vehicle to grab the water rather than to skip thereover. This is augmented by the escape of cushion air from beneath the vehicle at the side opposite to the turn as the vehicle rolls in the direction of the turn. The discharge of the puffport in the direction away from the turn provides a thrust to the vehicle in the direction of the turn, complimentary to the thrust provided by the escape of cushion air from beneath the skirt wall at the opposite side of the vehicle, whereby the maneuverability of the vehicle is improved. In prior known systems in which the puffport air was discharged into the direction of the turn a vehicle thrust was created in the direction away from the turning direction, causing the vehicle to skip over the water and greatly increasing the radius of the turn.

While the known "opposite-thrust" puffport systems are effective in causing the vehicle to roll slightly in the direction of the turn, thereby producing a small cushion air escape thrust complimentary to the puffport thrust, there is room for improvement since these desired effects are relatively small and only a small cushion air gap is produced under most operating conditions.

SUMMARY OF THE INVENTION

The present invention relates to a novel system for substantially improving the maneuverability of air cushion vehicles having at least one forward volute or air cushion fan by increasing the roll of the vehicle and the size of the air cushion gap while also producing a thrust of increased effectiveness in the direction to which the vehicle is being turned.

These complimentary advantages and improvements are produced by locating adjustable air diverting means or side thrusters at opposite sides of the volute housing, at a forward central location on the superstructure of the vehicle above the center of gravity thereof, and actuating the said means at either side of the volute housing to divert a portion of the cushion air flow from the volute fan and cause it to be discharged in the direction away therefrom. The effect is to produce a strong thrust to the vehicle in the direction to which the turn is being made, and to increase the roll of the vehicle in the direction of the turn. The increased roll increases the size of the air cushion gap at the opposite side of the vehicle, which increases the complimentary air cushion escape thrust at said gap. Also, the location of the deflectors or side thrusters above the center of roll of the vehicle has been found to increase the effectiveness of the sideforce thrust in reducing the slippage of the vehicle away from the turn or, conversely, in increasing the tightness of the turn.

Thus, the present maneuvering system involves an ACV having a forward volute fan and housing, adjustable air-deflecting means located on opposite sides of the housing openable outwardly and away from each other, and communicating in open position with the air flow generated by the volute fan, to divert a portion thereof from its normal downward path, to pressurize the air cushion skirt, to a diverted path out of the housing in a direction away therefrom, whereby each deflector or side thruster can be opened to exhaust a portion of the air from the volute housing toward one side as the vehicle is making a turn towards the opposite side. This causes the vehicle to roll in the direction of the turn whereby the side hull or skirt wall at the opposite side of the vehicle rises out of the water a substantial distance to permit the pressurized cushion air beneath the vehicle at said side to escape. This results in an air cushion gap thrust in the same direction as the volute thrust, or complimentary thereto, which greatly improves the maneuverability of the vehicle.

DETAILED DESCRIPTION

Figure 1:
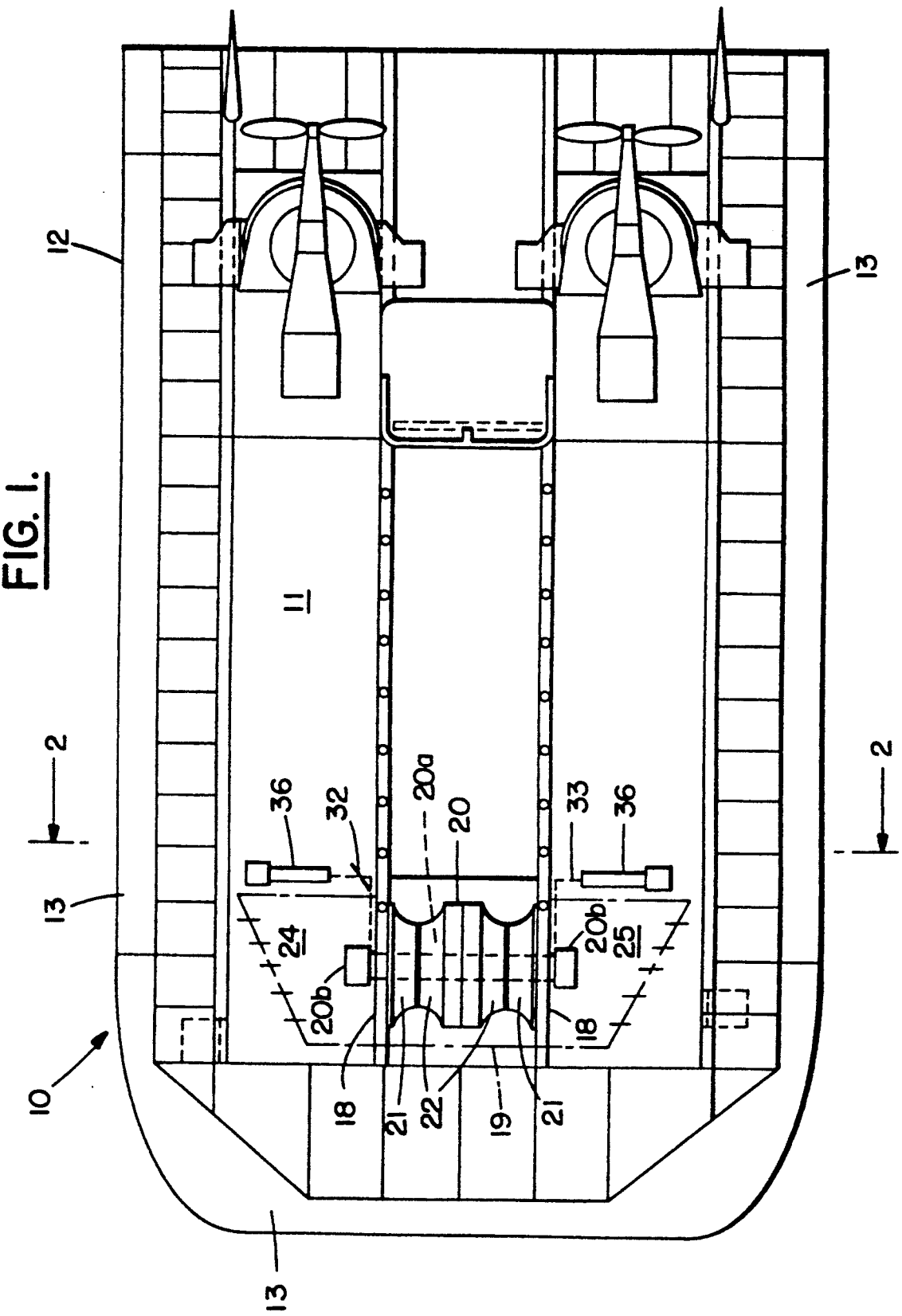
FIG. 1 is a plan view of an air cushion vehicle having a volute housing provided with opposed thruster means according to an embodiment of the present invention.

FIG. 1 illustrates an air cushion vehicle 10 according to one embodiment of the present invention. The vehicle 10 comprises a main hull or platform 11 which buoyantly supports the craft when "off-cushion", i.e., when the surrounding inflatable air seal skirt system 12 is not inflated or pressurized. The skirt system may comprise any conventional system such as one having an inflatable, flexible bag 13 with a depending finger seal system 14 enclosing air cushion cavity sections 15 and 16 separated by a longitudinal stability seal 17, as illustrated by FIG. 2.

Figure 3:
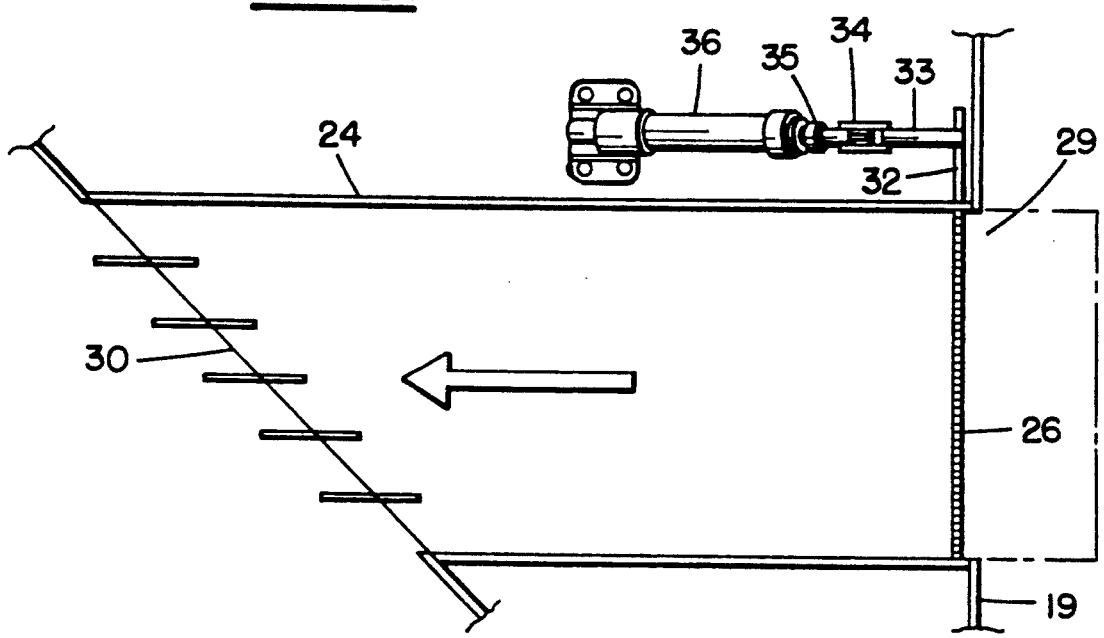
FIG. 3 is a plan view of a starboard side volute thruster assembly according to one embodiment of the present invention.

The air support cushion is, at least in part, formed by drawing air in through the upper intake vents 18 of the forward volute housing 19 by means of a volute fan 20 having a rotatable shaft 20a supported on bearing blocks 20b, driven by a variable speed motor, and directing the air through conduit 23 opening into the flexible bag 13 and cushion cavities 15 and 16 at various locations around the vehicle. A portion of the air passes through openings in the inflated bag 13 into the finger seal system 14 and a portion thereof passes through openings in the inflated fingers to pressurize the air cushion cavities 15 and 16 beneath the vehicle to float the vehicle on a cushion of air, as shown by FIG. 3. A longitudinal partition device 17 may be present to segregate the cavities 15 and 16.

Figure 2:
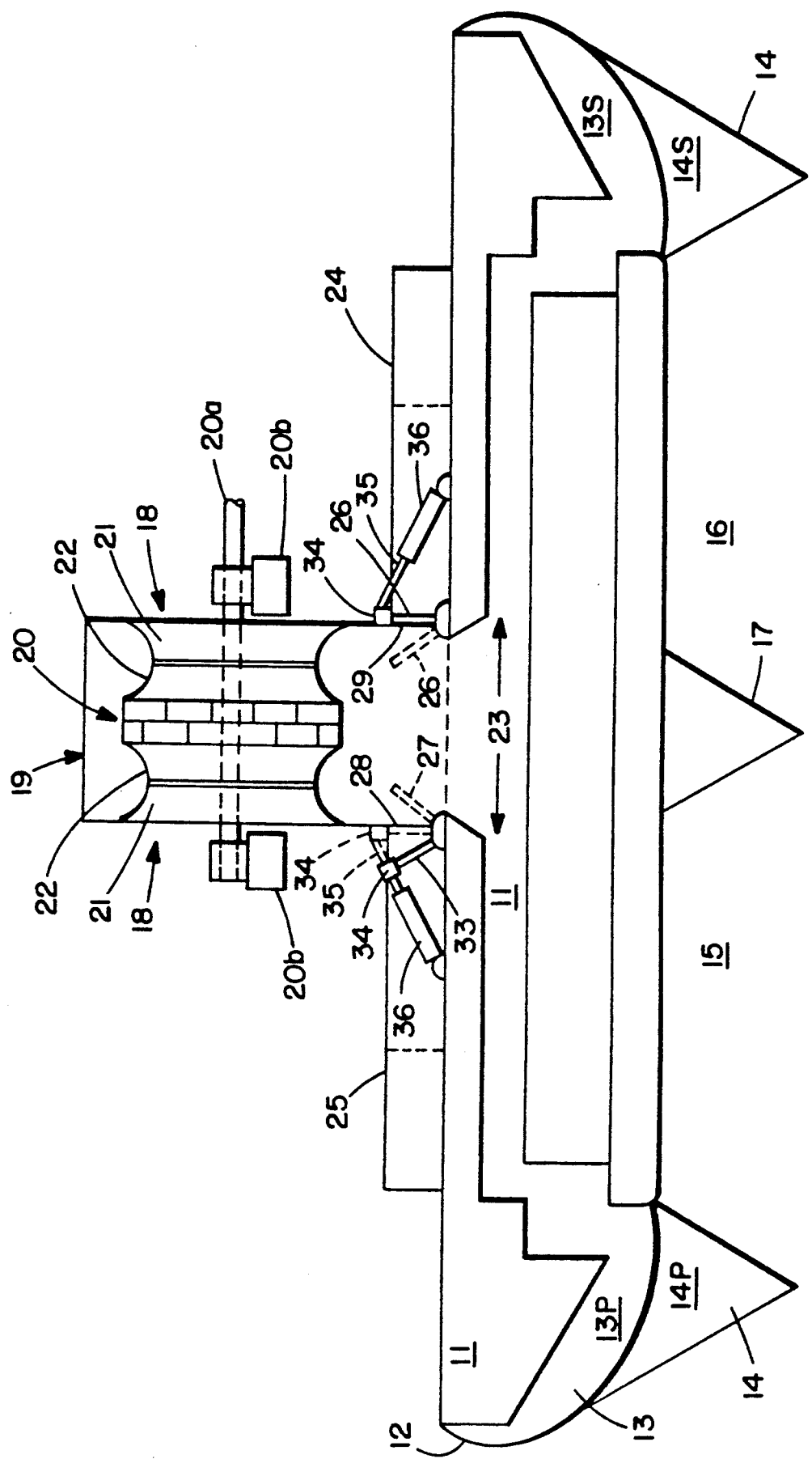
FIG. 2 is a view along the line 2—2 of FIG. 1 illustrating the starboard side volute thruster means in open position.

The present invention provides a system for selectively diverting and directing volute air from the starboard side of the volute housing 19 through a starboard discharge duct 24 when the vehicle is being turned towards port as illustrated by FIG. 2, and/or for selectively venting volute air from the port side of the volute housing 19 through a port discharge duct 25 when the vehicle is being turned towards starboard.

Figure 4:
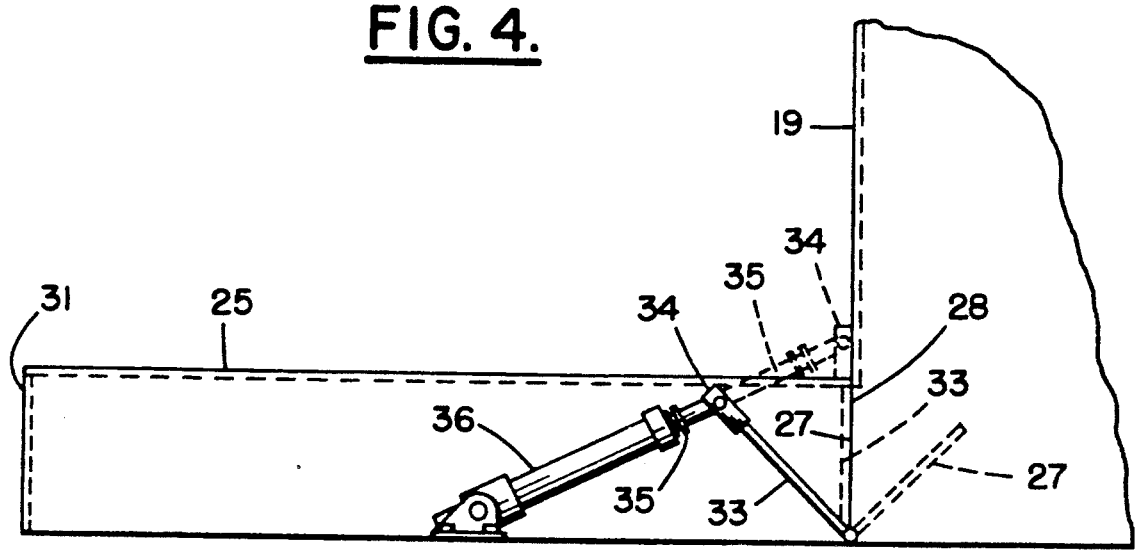
FIG. 4 is a rear view of the portside volute thruster assembly of FIG. 2.

In the embodiment illustrated by FIGS. 3 and 4, the volute side thrusters each comprise a deflector door 26,27, an elongate discharge duct 24,25, the entrance end of which encloses an opening or vent 29,28 in the side of the volute housing 19, adjacent the deck of the vessel, and the discharge end 30,31 which is open and adjacent a side of the vessel.

According to the embodiment illustrated by the drawings, the communication between each of the discharge ducts 24 and 25 and the volute air flow which is generated by the volute fan 20 and which normally is directed inwardly through stationary inlet bellmouths 21 and rotating fan shrouds 22, and downwardly through diffuser duct 23 in the hull to pressurize the skirt system bags 13S and 13P and fingers 14S and 14P and cavity 15 and 16, is controlled by remotely operated air-deflector doors 26 and 27 located on the sides of the volute housing 19 immediately above the diffuser duct 23. Both doors 26 and 27 may be opened simultaneously to divert the volute air through both of the discharge ducts 24 and 25, thus uniformly reducing air cushion cavity pressure and slowing the vehicle.

As illustrated by FIG. 2, when the starboard scoop or air-deflector door 26 is pivoted into the volute housing to open position, uncovering the starboard-side discharge vent 29 in the volute housing 19, while the port scoop or door 27 is retracted in closed position to seal the portside discharge vent 28 in the volute housing 19, the pressurizing air drawn into the volute housing through intake vents 18 and bellmouths 21 by the volute fan 20 continues to flow into the diffuser duct 23. However, the pivoted door 26 on the starboard side of the volute housing 19 deflects a substantial portion of the volute air flow through vent 29 and out discharge duct 24 in the starboard direction, thereby creating a thrust to the vehicle in the opposite or port direction since the discharge scoop 26 and vent 29 are located above the deck, near the centerline of the vehicle and above the center of roll of the vehicle in the port direction to which the vehicle is being turned.

The fact that the air discharge thrust is above the center of roll causes the vehicle to roll in the direction of the turn. The roll results in a greater cushion air gap on the starboard side with the open thruster or deflector door, as illustrated by FIG. 2. This creates complimentary jets of pressurizing air in the starboard direction, away from the turn, which impart a complimentary thrust to the vehicle in the direction of the turn, thereby improving the maneuverability of the vehicle towards port.

Referring again to FIG. 2, after the turn in the port direction has been completed, the starboard side thruster is deactivated by retracting the starboard deflector door 26 to upright position in which it seals the volute housing opening 29. This causes the vehicle to stabilize horizontally for normal operation in the straight direction.

In order to improve maneuverability and tightness of turns in the starboard direction the foregoing procedure is reversed. Thus, the portside deflector door 27 is pivoted to open position, as shown by means of broken lines, to deflect a portion of the pressurizing air normally flowing into the diffuser duct 23, bag 13P/S, fingers 14P/S and cushion cavity 15/16. This causes the deflected portion of the volute air to exit opening 28 and portside discharge duct 25 of the portside thruster, and causes the vehicle to roll towards the starboard direction of the turn. A complimentary thrust is imparted to the vehicle by the discharge of pressurized air from the duct 25 and from the air gap beneath the finger section 14P to improve the turning ability and reduce the turning radius in the starboard direction. Reclosing the portside deflector door 27 to seal vent 28 deactivates the portside thruster and restabilizes the vehicle horizontally.

In addition to improving the maneuverability of the present air cushion vehicles, the present thruster system can be activated to rapidly reduce the speed of the vehicle. This is accomplished by simultaneously activating both the portside and starboard thrusters to cause the volute air to be deflected equally from both side thrusters while greatly reducing the air supply to the skirt systems and cushion cavities 15 and 16, whereby the vehicle settles into the water to close the air gap or curtain which normally supports the vehicle over the water and to gradually produce speed-reducing water resistance which slows the vehicle.

While it will be apparent to those skilled in the art, in the light of the present disclosure, that any number of different mechanisms may be used to produce the remote activation of portside and starboard side thrusters, a specific hydraulic cylinder mechanism is illustrated by FIGS. 3 and 4 of the drawings.

As illustrated by FIG. 2, the mechanisms of FIGS. 3 and 4 comprise the volute housing 19, starboard exhaust opening or vent 29 in FIG. 3 and port exhaust opening or vent 28 in FIG. 4, starboard deflector door 26 and discharge duct in FIG. 3 and portside deflector door 27 and discharge duct 25 in FIG. 4.

The starboard side thruster mechanism of FIG. 3 comprises the deflector door 26 illustrated in retracted, closed position, covering the exhaust opening 29, and also illustrated in open, deflecting position by means of broken lines. The door 26 is connected to a horizontal lower pivot or torque hinge 32 having an upright torque arm 33 connected thereto at an angle of about 45° relative to the door 26. The upper end of the torque arm 33 comprises a link member 34 to which the end of piston 35 of hydraulic member 36 is pivotally connected. The hydraulic member 36 is fastened to the deck of the vehicle, adjacent the rear wall of the discharge duct 24, and is remotely activatable in conventional manner to retract the piston 35 and arm 33 and pivot door 26 to vertical position to seal the volute housing opening or vent 29, as illustrated in FIG. 3, or to extend the piston 35 and pivot the arm 33 into vertical position and pivot the door 26 into the volute housing to open the vent 29, as illustrated by means of broken lines in FIG. 4.

For purposes of simplicity, the hydraulic mechanisms and pivot mechanisms of FIGS. 3 and 4 are numbered the same. Referring to FIG. 4, when the torque arm 33 is retracted by the retraction of the piston 35, as shown by solid lines, the door 27 is pivoted to vertical or closed position to seal the vent 28 and deactivate the side thruster. When the hydraulic cylinder 36 is activated to cause the full extension of the piston member 35, shown by broken lines, this pivots the horizontal torque hinge 32 and the door 27 connected thereto about 45° to open air-deflecting position, shown by broken lines. In such open position door 27, or door 26, cause a portion of the volute lift air to enter the discharge duct 25 or 24, to produce a desired sidewise thrust which improves the maneuverability of the vehicle.

For turns towards starboard, door 27 is remotely actuated to open position, while door 26 remains closed. The diverted air flow enters duct 24 for horizontal discharge towards starboard. This creates a thrust and causes the vessel to roll in the port direction to assist the vessel as it is turned toward port.

The roll of the vessel in one direction causes the inflated fingers at the opposite side of the vessel to be lifted a greater distance above the water to permit cushion air to escape in the direction opposite to the roll, which direction is the same as the direction of air discharge from the thruster duct 24 or 25. This creates a complimentary thrust to the vessel in the direction of the turn to substantially improve the maneuverability of the vessel.

The fact that both the side thruster force and the air cushion escape thrust force are applied to the vehicle at locations remote from the turning axis of the vehicle has been found to substantially increase their effectiveness and improve the maneuverability of the vehicle over prior known systems.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An air cushion vehicle having a centerline and a center of gravity, said vehicle comprising a hull section having a deck, a peripheral air cushion seal means attached to said hull section and depending therefrom to form an enclosed air cushion compartment beneath the hull section, air volute means for inflating said air cushion seal means and for pressurizing said air cushion compartment, at least one of said air volute means comprising a volute housing located above the deck along the centerline of the vehicle, said volute housing having opposed portside and starboard side walls, air-inlet openings in said walls for admitting a flow of pressurizing air sucked in by air volute means therewithin, an air outlet opening through said hull section and a lower diffusion duct communicating between the air outlet openings of said volute housing and said air cushion seal means for directing pressurizing air to said seal means and to the air cushion compartment beneath the hull section, the opposed portside and starboard side walls of the volute housing each having a normally-closed air-discharge vent, means for opening either or both of said vents to permit a portion of the flow of pressurizing air to be diverted and discharged from said volute housing as volute housing discharge air through said vents towards port or starboard direction, from a location above the center of gravity of said vehicle, to cause the vehicle to roll in a roll direction opposite to the direction of discharge whereby pressurized air can escape from beneath the air cushion seal means in the direction opposite the roll direction, said air escape and said volute housing discharge air imparting a complimentary thrust to the vehicle in the roll direction.

2. An air cushion vehicle according to claim 1 in which each said normally-closed air-discharge vent opens into a duct which extends from said housing in the port or starboard direction and opens adjacent the port or starboard side of the vehicle.

3. An air cushion vehicle according to claim 1 in which each said normally-closed air-discharge vent comprises a door means pivotably attached for movement into said housing to open the vent and divert a portion of the flow of the pressurizing air from said housing in the port and/or starboard direction.

4. An air cushion vehicle according to claim 3 comprising remote-control means for pivoting each said door means between closed and opened positions.

5. An air cushion vehicle according to claim 4 in which each said remote control means comprises a hydraulic cylinder having a piston means, the movement of which causes movement of the door means between closed and open positions.

* * * * *